US010082628B2

United States Patent
Sugiyama (10) Patent No.: US 10,082,628 B2
(45) Date of Patent: Sep. 25, 2018

(54) OPTICAL DEVICE, TUNABLE LIGHT SOURCE, AND OPTICAL TRANSMITTER

(71) Applicant: Fujitsu Optical Components Limited, Kawasaki-shi, Kanagawa (JP)

(72) Inventor: Masaki Sugiyama, Kawasaki (JP)

(73) Assignee: FUJITSU OPTICAL COMPONENTS LIMITED, Kawasaki (JP)

(*) Notice: Subject to any disclaimer, the term of this patent is extended or adjusted under 35 U.S.C. 154(b) by 0 days.

(21) Appl. No.: 15/605,192

(22) Filed: May 25, 2017

(65) Prior Publication Data

US 2017/0357054 A1  Dec. 14, 2017

(30) Foreign Application Priority Data

Jun. 13, 2016 (JP) ................................. 2016-117267

(51) Int. Cl.
G02B 6/28 (2006.01)
G02B 6/125 (2006.01)
G02B 6/293 (2006.01)
G02B 6/12 (2006.01)

(52) U.S. Cl.
CPC .......... *G02B 6/2861* (2013.01); *G02B 6/125* (2013.01); *G02B 6/29398* (2013.01); *G02B 2006/12061* (2013.01); *G02B 2006/12097* (2013.01)

(58) Field of Classification Search
None
See application file for complete search history.

(56) References Cited

U.S. PATENT DOCUMENTS

| | | | |
|---|---|---|---|
| 6,256,442 B1* | 7/2001 | Nolan ................... | G02B 6/10 385/129 |
| 2005/0129363 A1* | 6/2005 | McGreer ................ | G02B 6/105 385/37 |
| 2011/0102804 A1 | 5/2011 | Lipson et al. | |

FOREIGN PATENT DOCUMENTS

JP      2011-158730      8/2011

OTHER PUBLICATIONS

Espacenet Bibliographic data, Japanese Publication No. 2011-158730 published Aug. 18, 2011.

* cited by examiner

Primary Examiner — Jerry Rahll
(74) Attorney, Agent, or Firm — Staas & Halsey LLP (57) ABSTRACT

A disclosed optical device includes a first waveguide disposed between a branching portion and a multiplexing portion on a semiconductor substrate, and a second waveguide disposed between the branching portion and the multiplexing portion, the second waveguide being longer than the first waveguide. In the optical device, an optical confinement effect of the first waveguide is greater than an optical confinement effect of the second waveguide, the first waveguide has a curvature with a first curvature radius (Rs), the second waveguide has a curvature with a second curvature radius (Rl), and the first curvature radius is smaller than the second curvature radius.

14 Claims, 10 Drawing Sheets

OPTICAL DEVICE, TUNABLE LIGHT SOURCE, AND OPTICAL TRANSMITTER

CROSS-REFERENCE TO RELATED APPLICATION

This patent application is based upon, and claims the benefit of priority of Japanese Patent Application No. 2016-117267 filed on Jun. 13, 2016, the entire contents of which are incorporated herein by reference.

FIELD

The embodiments discussed herein relate to an optical device, a tunable light source, and an optical transmitter.

BACKGROUND

Wavelength division multiplexing (WDM) is applied to achieve high-capacity optical communications. The WDM technology employs a tunable light source (TLS) that oscillates light of different wavelengths. In some cases, a wavelength monitor for wavelength control may be provided in the tunable light source. The wavelength monitor is implemented by, for example, a wavelength filter having a constant periodic transmission spectrum and a photodiode (PD). Light having different wavelengths may be obtained by the periodic transmission spectrum. A delay interferometer is used as a wavelength filter of the periodic transmission spectrum.

In order to control the wavelength with high precision, it is desirable for the wavelength filter of the wavelength multiplexing light source to have a free spectral range (FSR) of approximately one nm or less. The FSR is determined based on the delay amount of the delay interferometer.

In the related art WDM technologies, tunable light sources based on a planer lightwave circuit (PLC) having an optical circuit formed on a quartz substrate have been used. In view of down-scaling devices, it is desirable to form a resonator or a wavelength filter by silicon photonics technology. In a case where the delay interferometer is formed of a silicon (Si) waveguide, an FSR of 1 nm may be obtained by setting the difference between the two arm lengths to approximately 0.5 to 1 mm.

However, the thermo-optic coefficient of silicon (Si) is larger than that of the PLC waveguide, and the delay amount is likely to change due to temperature change. The thermo-optic coefficient represents temperature dependence of optical properties such as refractive index. When Si, which has a larger thermo-optic coefficient than quartz is used, the peak wavelength of the wavelength filter tends to shift due to temperature change.

Figure 1:
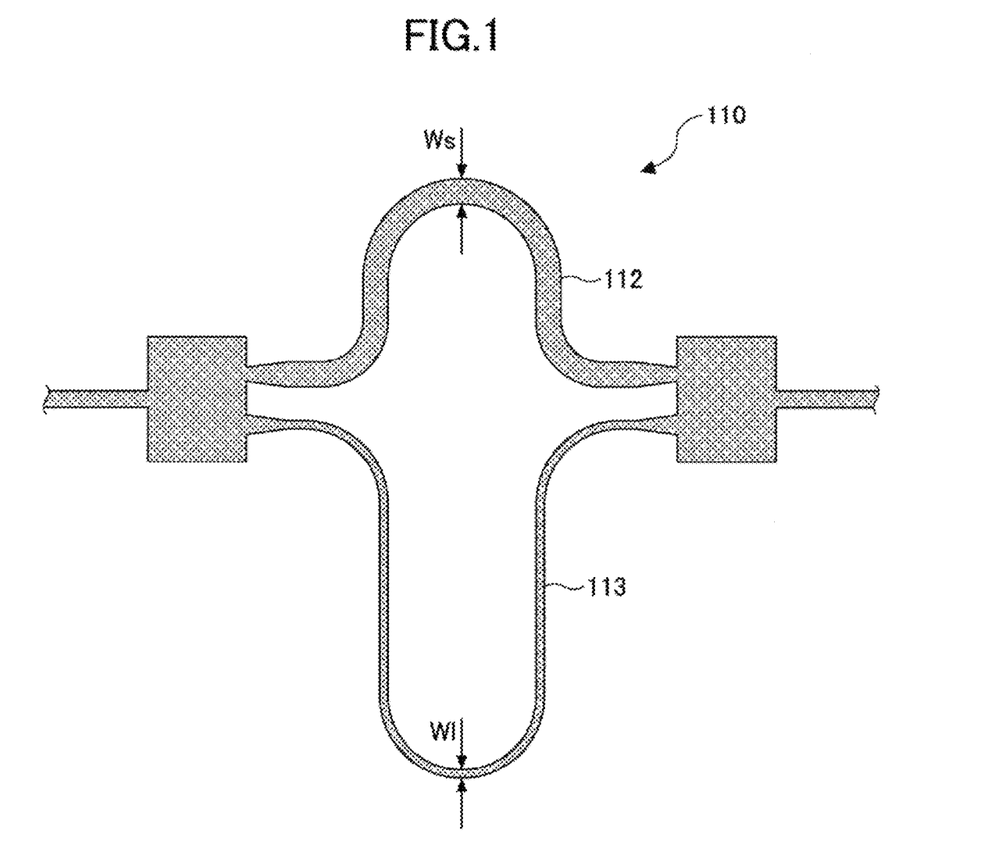
FIG. 1 is a schematic diagram of a related art delay interferometer with reduced temperature dependency.

FIG. 1 illustrates a related art configuration example for canceling a change in delay amount due to a temperature change. Of the two waveguides 112 and 113 forming the delay interferometer 110, the core width Ws of the shorter waveguide 112 is made thicker than the core width Wl of the long waveguide 113. This configuration allows the difference in temperature dependency change occurring between the two waveguides 112 and 113 to be canceled out to make the temperature dependence of the optical lengths approximately the same (see, e.g., Patent Document 1 and Patent Document 2).

RELATED-ART DOCUMENTS

Patent Documents

Patent Document 1: U.S. Patent Application Publication 2011/0102804 A1

Patent Document 2: Japanese Laid-open Patent Publication No. 2011-158730

SUMMARY

According to an aspect of an embodiment, an optical device includes a first waveguide disposed between a branching portion and a multiplexing portion on a semiconductor substrate; and a second waveguide disposed between the branching portion and the multiplexing portion, the second waveguide being longer than the first waveguide. In the optical device, an optical confinement effect of the first waveguide is greater than an optical confinement effect of the second waveguide, the first waveguide has a curvature with a first curvature radius (Rs), the second waveguide has a curvature with a second curvature radius (Rl), and the first curvature radius is smaller than the second curvature radius.

The object and advantages of the invention will be realized and attained by means of the elements and combinations particularly pointed out in the appended claims.

It is to be understood that both the foregoing general description and the following detailed description are exemplary and explanatory and are not restrictive of the invention.

Additional objects and advantages of the embodiments will be set forth in part in the description which follows, and in part will be obvious from the description, or may be learned by practice of the invention.

DESCRIPTION OF EMBODIMENTS

In order to apply the delay interferometer of FIG. 1 to the wavelength filter of the Si waveguide to cancel the effect of the temperature change while maintaining the FSR of 1 nm or less, the length of the shorter waveguide 112 needs to be 0.5 to 1 mm, and the length of the longer waveguide 113 needs to be approximately twice the length of the shorter waveguide 112. Accordingly, the two waveguides 112 and 113 are bent and disposed as illustrated in FIG. 1. In this case, the area occupied by the delay interferometer is increased, and the device size is increased.

Further, when the delay interferometer is used as a wavelength filter of a tunable light source, a stimulated emission medium subjected to injection of current serves as a heat source, and a temperature difference easily occurs between the two waveguides 112 and 113. As a result, the peak wavelength of the filter easily shifts with temperature change.

Accordingly, an object of the embodiment is to implement an optical device that is small in size and has low dependence on temperature.

Prior to describing the configuration and method of the embodiment, a technical problem in applying the delay interferometer of FIG. 1 to the tunable light source of the embodiment will be described in more detail with reference to FIGS. 2 and 3.

Figure 2:
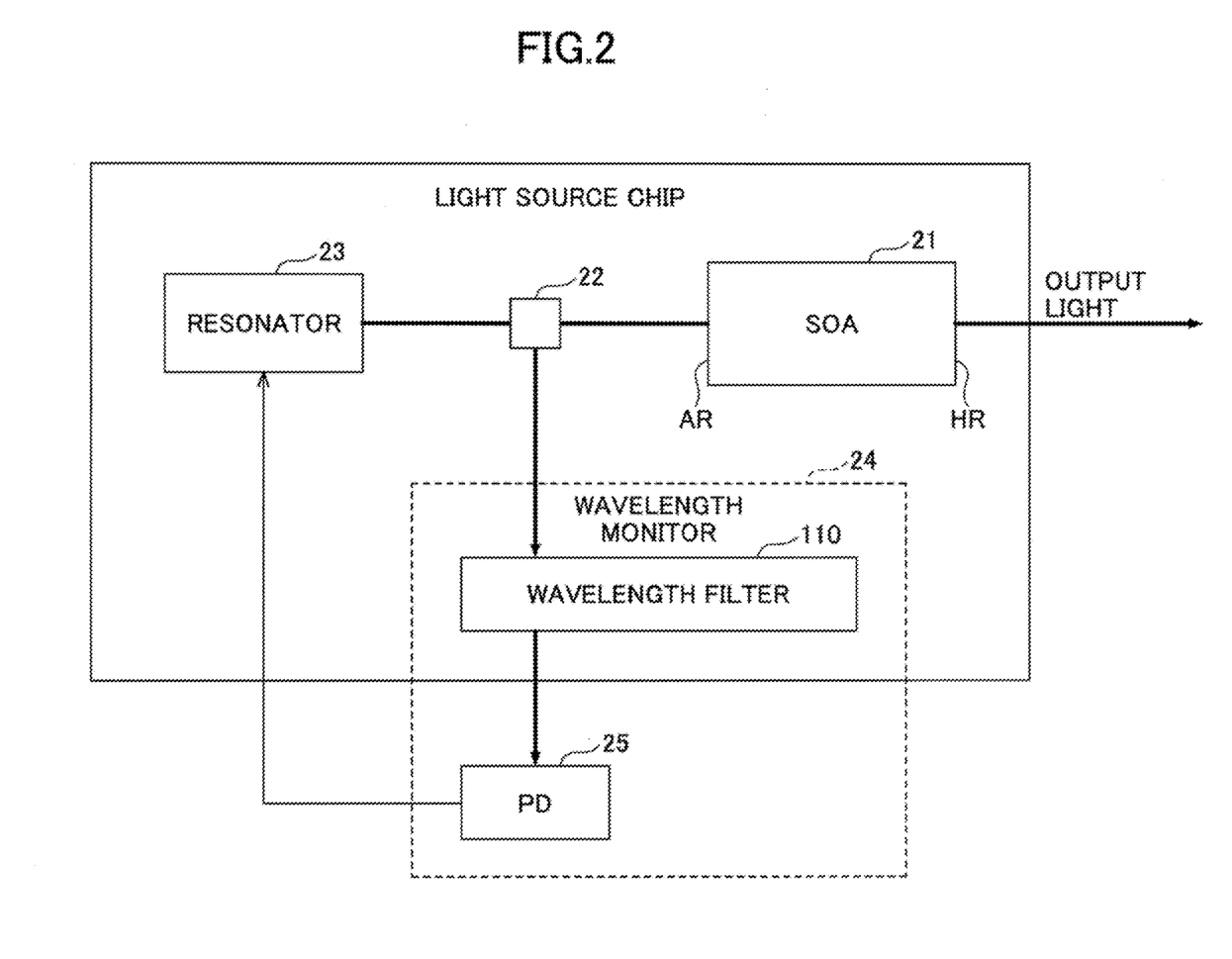
FIG. 2 is a configuration diagram of a tunable light source according to an embodiment to which a delay interferometer is applied.

FIG. 2 is a schematic diagram of a light source chip serving as a tunable light source. The tunable light source has a light source formed of a semiconductor optical amplifier (SOA) 21 and a resonator 23, and a wavelength monitor 24. A part of light generated by the light source is branched by a coupler 22 and input into the wavelength monitor 24. The wavelength monitor 24 includes a wavelength filter and a photodetector (PD) 25. The output of the photodetector 25 represents monitor information and is fed back to the resonator 23 to control a wavelength of the light source.

More specifically, light induced and emitted by the SOA 21 as a result of carrier injection is guided to the resonator 23, and light of a specific wavelength is resonated, amplified, and laser oscillated. A high reflection film HR is formed at an emission end of the SOA 21, and antireflection (AR) coating is applied to a surface facing the resonator 23 of the SOA 21. A reflection portion such as a distributed Bragg reflector is formed at an end portion of the resonator 23 opposite to a surface facing the SOA 21 of the resonator 23. A laser resonator is formed of a HR coated surface of the SOA 21 and the reflection portion of the resonator 23.

A part of the laser-oscillated light is input to the wavelength monitor 24. The wavelength filter used in the wavelength monitor 24 has a periodic transmission spectrum and may filter light of multiple wavelengths.

Figure 3:
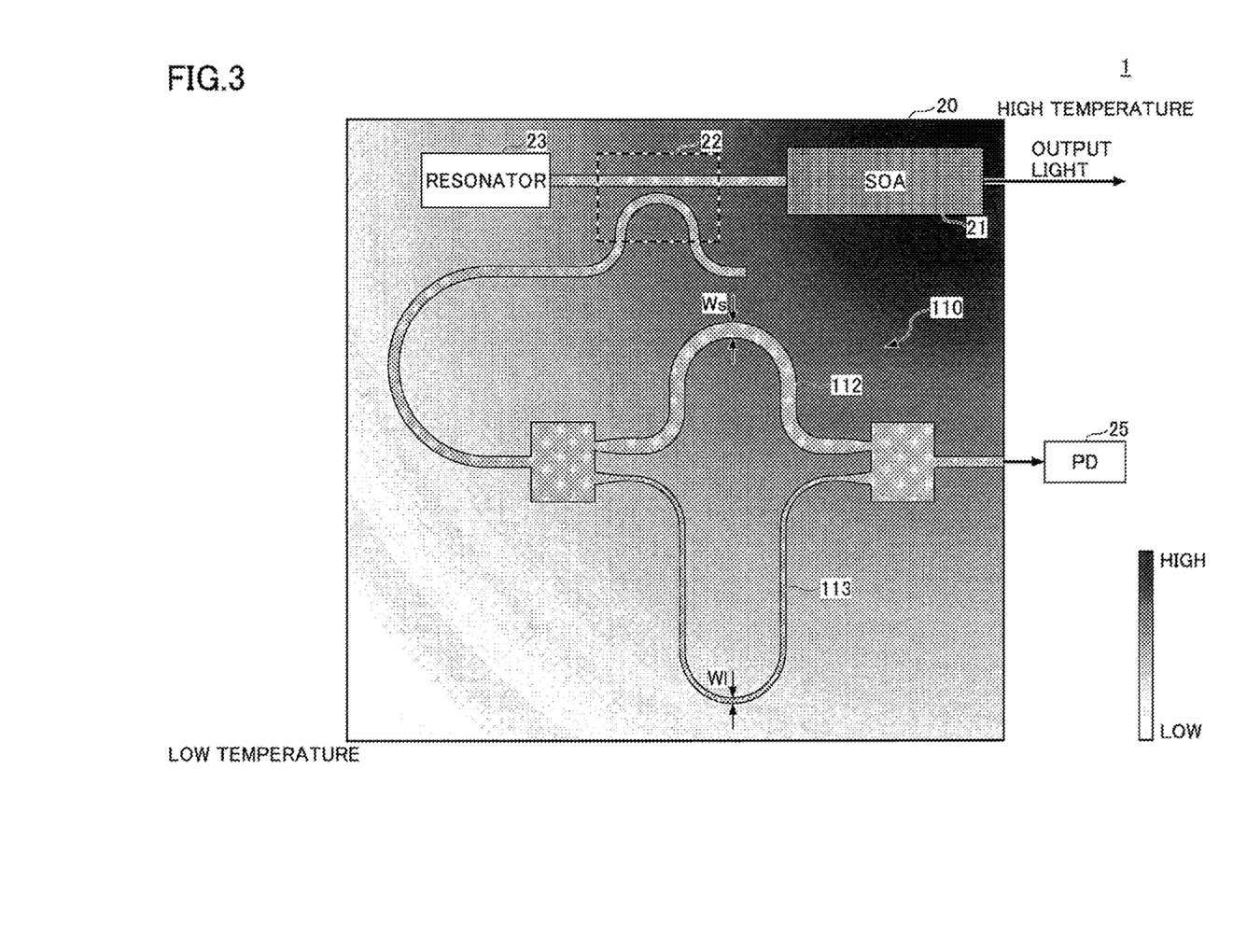
FIG. 3 is a diagram illustrating a technical problem in a case where a delay interferometer of the related art configuration is applied to the tunable light source of the embodiment.

FIG. 3 illustrates a configuration when the delay interferometer 110 of FIG. 1 is applied to the wavelength filter of the tunable light source of FIG. 2. Gradation on the substrate 20 shows a temperature gradient. The darker part indicates a higher temperature region; the lower the color, the lower the temperature. The SOA 21 is formed, for example, of an indium phosphide (InP)-based compound semiconductor and has high luminous efficiency; however, current in a portion not contributing to light emission becomes heat and exits out. Even when a temperature control mechanism for stabilizing the oscillation frequency of the laser is provided, the SOA 21 serves as a heat source, and a temperature gradient is generated in the substrate 20 on which the waveguides 112 and 113 are formed. The temperature gradient of the substrate 20 varies with fluctuation of current injected into the SOA 21 and a change in an ambient temperature.

Among the waveguides of the delay interferometer 110 forming the wavelength filter, the optical confinement may be increased by increasing the width Ws of the shorter waveguide 112, which may increase an effective thermo-optic coefficient. By increasing the change in the refractive index with respect to the temperature change of the waveguide 112, the change in the optical length of the waveguide 112 due to change in temperature may be made equal to the change occurring in the waveguide 113, so as to cancel the change in the delay amount.

However, when the two waveguides 112 and 113 of the delay interferometer 110 are arranged separately as illustrated in FIG. 3, the temperature difference between the waveguide 112 and the waveguide 113 becomes large due to the effect of the SOA 21 serving as a heat source. As a result, despite adjustment of the thermo-optic coefficient, the peak wavelength of the wavelength filter tends to shift with respect to temperature change.

In order to shorten the length of the waveguides 112 and 113 while controlling the effect of the temperature change in the configuration of FIG. 3, it is preferable to reduce the width W1 of the longer waveguide 113. However, when the waveguide 113 is thinned, light confinement is reduced and bending loss is increased. Accordingly, in the embodiment, an optical device that is small in size and exhibits controlled temperature dependence may be implemented by devising the arrangement and the configuration of the wavelength filter, as will be described below.

Figure 4:
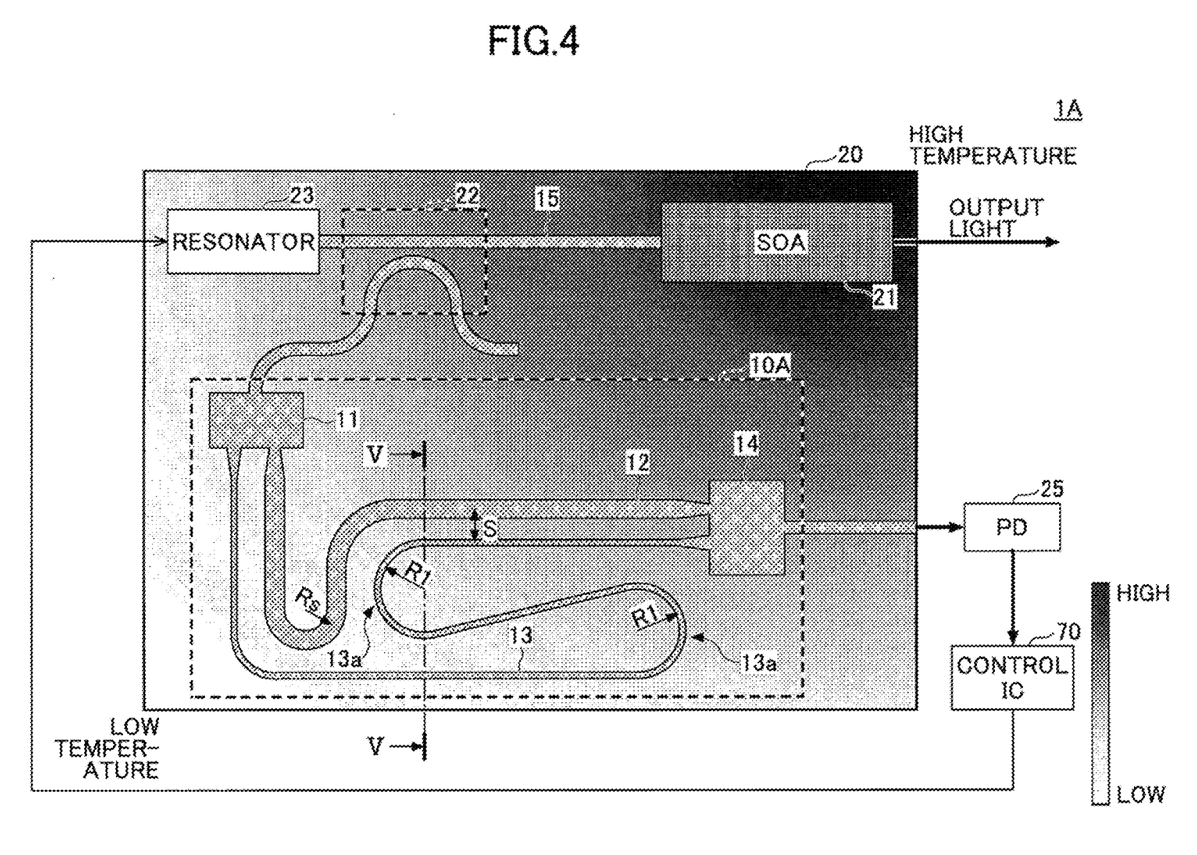
FIG. 4 is a schematic diagram of a tunable light source using a delay interferometer according to an embodiment.

FIG. 4 is a schematic diagram of a tunable light source 1A according to an embodiment. The tunable light source 1A has an external resonator laser element (light source) formed of the SOA 21 and the resonator 23, and a delay interferometer 10A as an optical device. The SOA 21 is a stimulated emission medium chip formed of a compound semiconductor, which is mounted on a silicon substrate 20 in the example of FIG. 4. The SOA 21 is disposed, for example, on a terrace formed on the substrate 20, and an active layer of the SOA 21 is aligned with the waveguide 15, which is formed on the substrate 20, in a height direction (Z direction) and in an in-plane (XY plane) direction of the substrate 20. The SOA 21 is optically coupled to the resonator 23 via the waveguide 15. A selectable configuration may be employed as the resonator 23; for example, a configuration in which a ring or racetrack waveguide with a predetermined circumferential length is combined with a distributed Bragg reflector may be used.

Light that is stimulated and emitted from the SOA 21 and amplified at the resonance frequency of the resonator 23 is output from one end of the SOA 21. A part of the light having a resonance wavelength is branched by a coupler 22 such as a directional coupler and input into the delay interferometer 10A.

The delay interferometer 10 A has a first waveguide 12 and a second waveguide 13 extending between a demultiplexer 11 and a multiplexer 14, and operates as a wavelength filter having a periodic transmission spectrum due to delay interference. The demultiplexer 11 and the multiplexer 14 are, for example, silicon slab waveguides. The first waveguide 12 and the second waveguide 13 are silicon core waveguides. The length of the first waveguide 12 is shorter than the length of the second waveguide 13. The length difference $\Delta L$ between the first waveguide 12 and the second waveguide 13 is determined according to a target FSR.

The width of the first waveguide 12 is greater than the width of the second waveguide 13. The width of the first waveguide and the width of the second waveguide 13 are set according to a target shift amount (nm/T) of the peak wavelength with respect to temperature. As an example, the target shift amount (temperature dependency) of the peak wavelength is set to be approximately 0.02 nm/° C. In accordance with this target value, the width of the first waveguide 12 is increased such that the temperature dependency in the optical length is adjusted to be equal between the first waveguide 12 and the second waveguide 13. The width of the second waveguide 13 may be narrowed as required. When the core width of the first waveguide 12 becomes too large, the first waveguide 12 may become multimode. When the core width of the second waveguide 13 becomes too small, light confinement becomes weak and loss occurs. Hence, the widths of the first waveguide 12 and the second waveguide 13 are adjusted within an appropriate range from the viewpoint of reduction in temperature dependency of the peak wavelength and single mode transmission with low loss.

The light passing through the delay interferometer 10A having a periodic transmission spectrum determined by the length difference ΔL between the waveguides is detected by the photodetector (PD) 25. The detection result is supplied to an external control IC (Integrated Circuit) 70, and the resonance frequency of the resonator 23 is controlled according to the detection result. The resonance frequency may be controlled, for example, by controlling a heating temperature of a heater provided in a ring or racetrack waveguide forming the resonator 23.

In one embodiment, the shorter first waveguide 12 includes a curvature with a curvature radius Rs, and the longer second waveguide 13 includes a curvature 13a with a curvature radius Rl. Rl is set larger than Rs (Rs<Rl). The bending loss of the second waveguide 13 is controlled by setting Rl larger than Rs, which enables the core width to be as small as possible. The effect of the refractive index change due to the temperature change may be reduced by reducing the width of the second waveguide 13, thereby preventing an increase in the waveguide length.

In the example of FIG. 4, the second waveguide 13 includes a serpentine waveguide having two or more turns and thus has two or more curvatures 13a in a serpentine waveguide portion. Although the curvature radius Rl of each curvature 13a is not necessarily the same, each curvature radius Rl is set to be larger than the curvature radius Rs of curvature of the first waveguide 12.

The first waveguide 12 is sufficiently thick so as not to generate multimode and exhibits strong optical confinement. This configuration may is not readily affected by bending loss even when the curvature radius Rs of the first waveguide 12 is made smaller than the curvature radius Rl of the second waveguide 13. The size of the tunable light source 1A may be reduced by reducing the bending radius Rs of the first waveguide 12.

The delay interferometer 10A is disposed at a position diagonal to the SOA 21 acting as a heat source on the substrate 20. Even when the first waveguide 12 and the second waveguide 13 are formed of silicon, the effect of the change in temperature gradient caused by a change in current or a change in ambient temperature may be prevented by disposing the delay interferometer 10 A at a position farthest from the SOA 21.

In the example of FIG. 4, the first waveguide 12 and the second waveguide 13 having different curvature radii are arranged close to each other at diagonal positions of the SOA 21 such that the tunable light source 1A is made compact. The shifting of the filter wavelength caused by the change in the temperature gradient may be controlled by disposing the first waveguide 12 and the second waveguide 13 close to each other within the same area on the substrate 20.

Note that a not optically coupled distance may be maintained between the first waveguide 12 and the second waveguide 13. A distance S between the first waveguide 12 and a part of the second waveguide 13 closest to the first waveguide 12 is desirably smaller than twice the curvature radius Rl of the second waveguide 13 (S<2×Rl). The distance S indicates a distance between the centers of the first waveguide 12 and the second waveguide 13. The two waveguides 12 and 13 are arranged in respective regions where temperature distributions are approximate so as to reduce the effect of the temperature gradient by making the distance S between the first waveguide 12 and the portion of the second waveguide 13 closest to the first waveguide 12 smaller than the size of the region occupied by a curved portion of the second waveguide 13.

Figure 5:
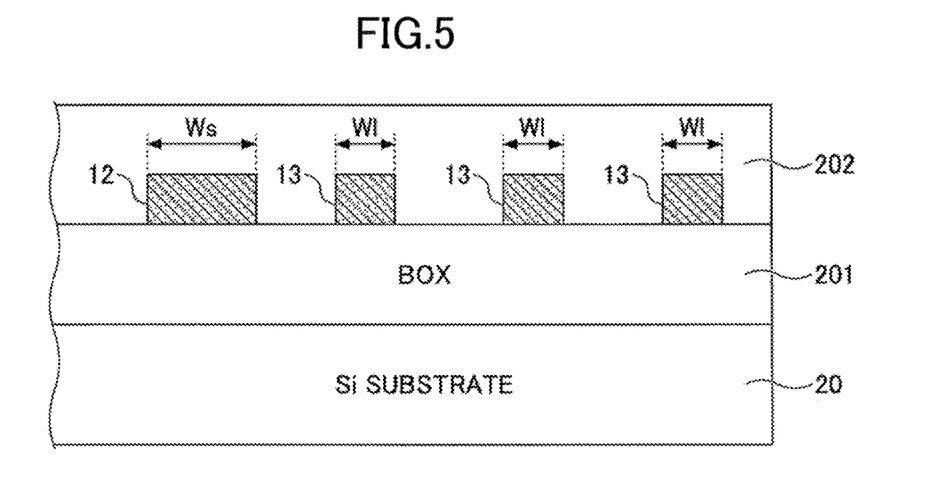
FIG. 5 is a cross-sectional diagram taken along line V-V of FIG. 4.

FIG. 5 is a cross-sectional diagram taken along a line V-V of FIG. 4. A BOX (Buried Oxide) layer 201 is disposed on the silicon substrate 20, and the first waveguide 12 and the second waveguide 13 made of silicon are formed on the BOX layer 201. The first waveguide 12 and the second waveguide 13 are each covered with a cladding layer 202 having a thermo-optic coefficient lower than that of silicon. The cladding layer 202 is made, for example, of silicon dioxide ($SiO_2$). The first waveguide 12 and the second waveguide 13 made of silicon surrounded by the BOX layer 201 and the cladding layer 202 serve as cores for light propagation. The thermo-optic coefficients of the BOX layer 201 and the cladding layer 202 are lower than that of silicon, and are less susceptible to temperature change than silicon.

The first waveguide 12 has a width Ws in a direction orthogonal to the optical axis. The second waveguide 13 has a width Wl in a direction perpendicular to the optical axis. The width Ws is larger than the width Wl. The temperature dependency of the delay interferometer 10A forming the wavelength filter may be reduced and the size of the tunable light source 1A may be reduced by changing the core widths of the first waveguide 12 and the second waveguide 13, so as to change the characteristics of light confinement and to obtain the planar arrangement of FIG. 4.

As a method of changing the optical confinement of the first waveguide 12 and the second waveguide 13, in addition to making the width of the core different, it may also be possible to change the height of the core between the two waveguides, the shapes of the waveguides, and the like.

Figure 6:
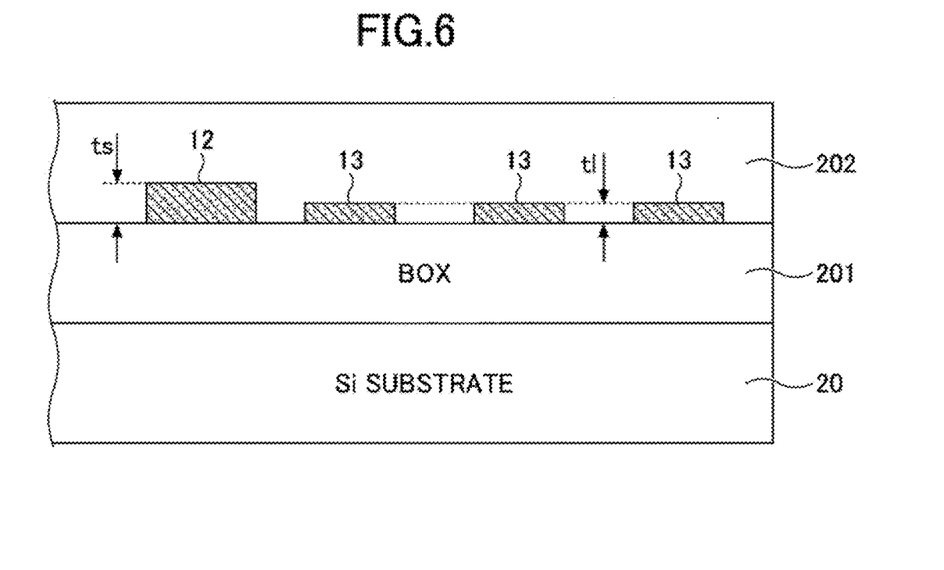
FIG. 6 is a diagram illustrating another configuration example for changing optical confinement between two waveguides.

FIG. 6 illustrates an example in which the height of the core differs between the first waveguide 12 and the second waveguide 13. The height ts of the short first waveguide 12 is made to be higher than the height tl of the long second waveguide 13. The height of the first waveguide 12 is increased to enhance light confinement, which may increase the refractive index change due to the temperature change; thereby cancelling a change in the delay amount by making the change in the optical length of the first waveguide 12 equal to the change in the optical length of the second waveguide 13.

Figure 7:
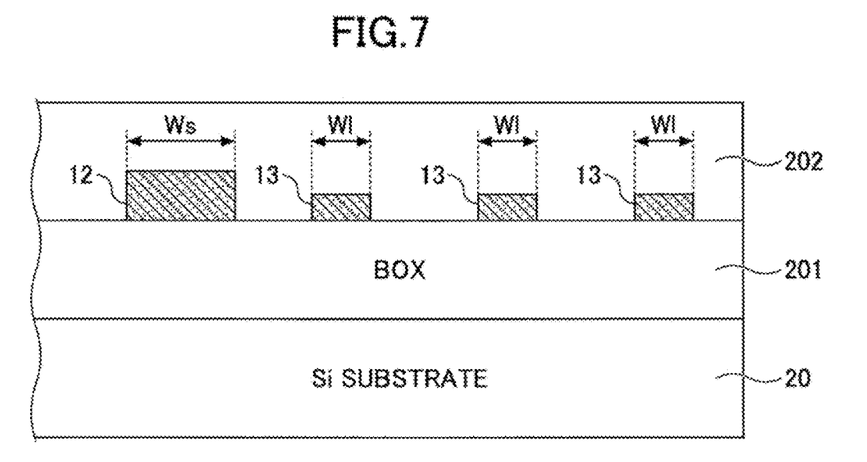
FIG. 7 is a diagram illustrating still another configuration example for changing optical confinement between two waveguides.

FIG. 7 illustrates an example of changing light confinement such that both the width and the height differ between the first waveguide 12 and the second waveguide 13. The width Wl of the second waveguide 13 is narrower than the width Ws of the first waveguide 12 and the height of the second waveguide 13 is shorter than the height of the first waveguide 12.

In the configuration of FIG. 7, the counterbalancing that is the refractive index change per unit length is increased by changing both the width and height of the silicon core. Hence, a layout having a shorter waveguide may be implemented.

Figure 8:
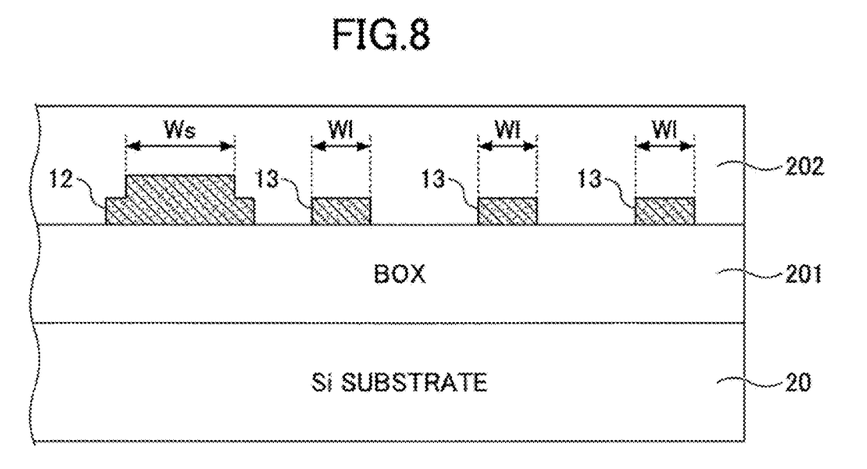
FIG. 8 is a diagram illustrating another configuration example for changing optical confinement between two waveguides.

FIG. 8 illustrates an example in which the type of the waveguide differs between the first waveguide 12 and the second waveguide 13. The first waveguide 12 is formed of a rib silicon core exhibiting a high optical confinement effect. The second waveguide 13 is formed of a thin wire silicon core. The width Ws of the rib portion of the first waveguide 12 is greater than the width Wl of the second waveguide 13. This configuration may also increase the counterbalancing that is the change in the refractive index per unit length large, and may implement a layout with a shorter waveguide.

In any of the configuration examples of FIGS. 6 to 8, the curvature radius Rl of curvature of the second waveguide 13 is larger than the curvature radius Rs of curvature of the first waveguide 12. The distance S between the centers of the closest portions of the first waveguide 12 and the second waveguide 13 is greater than the distance by which the two waveguides are optically coupled to each other as well as being smaller than twice the curvature radius Rl of curvature of the second waveguide 13. This configuration may control the temperature dependency of the delay interferometer 10A and may achieve a compact size of the optical device 10A.

Modification 1

Figure 9:
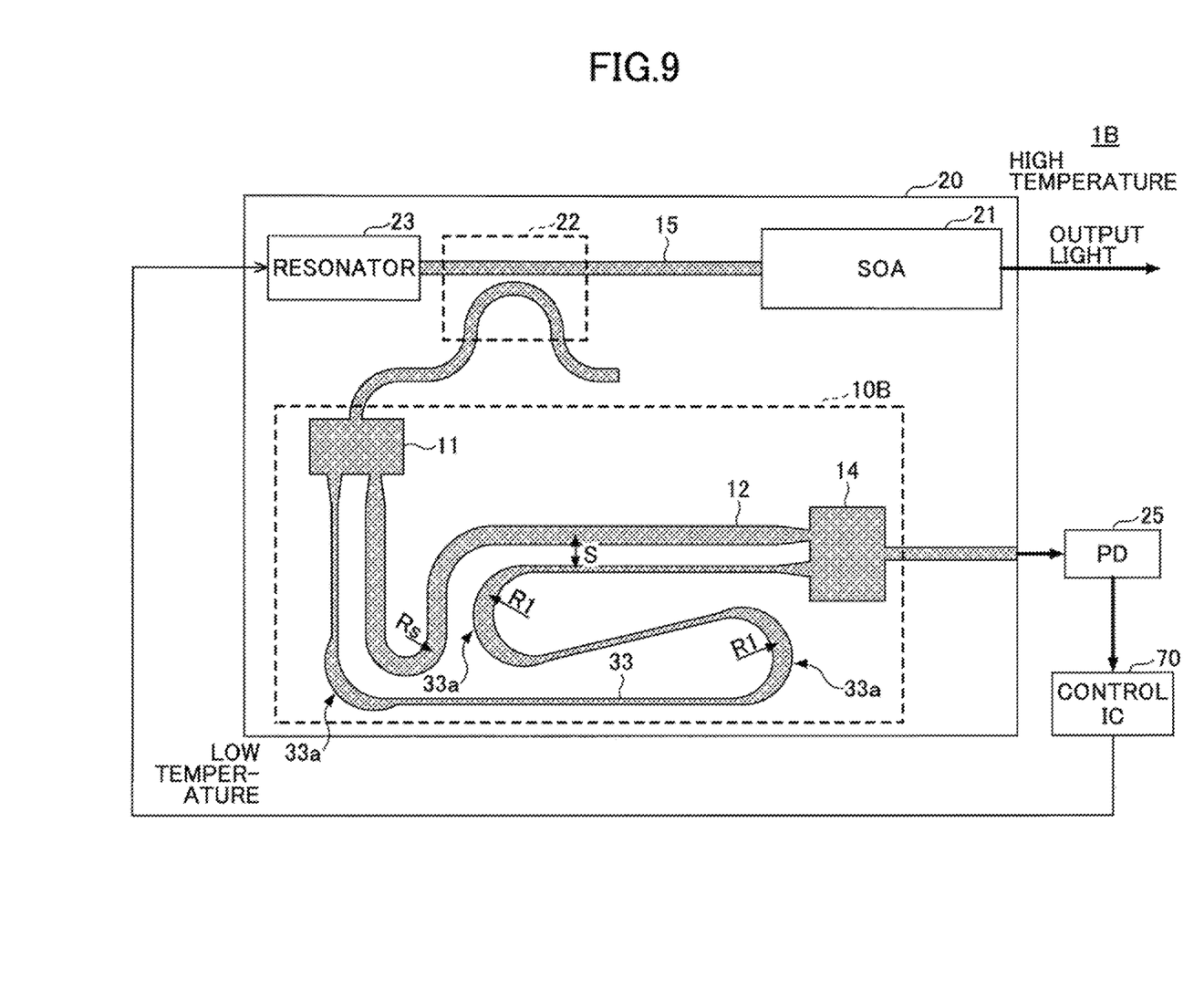
FIG. 9 is a diagram illustrating a first modification of the optical device according to the embodiment.

FIG. 9 illustrates a tunable light source 1B as a modified example of the tunable light source 1A. The tunable light source 1B has a delay interferometer 10B as an optical device for performing tunable filtering. The delay interferometer 10 B has a first waveguide 12 and a second waveguide 33 longer than the first waveguide 12. In the second waveguide 33, a width of the curvature 33a is formed to be larger than a width of a linear portion. This configuration may reduce a bending loss of the second waveguide 33 to enable reduction of the curvature radius Rl. A partial width change of the second waveguide 33 may be easily performed by pattern exposure and development by the silicon photonics technology.

In relation to the first waveguide 12, a delay characteristic between the waveguides is adapted to the mean width of the second waveguide 33. Compared with the configuration of FIG. 4, the length of the second waveguide 33 in the modified example 1 is slightly longer and the second waveguide 33 has a region where the width is partially widened; however, with respect to the optical device 1B overall, the effect of reducing the bending loss and the effect of reducing the size of the device may be obtained.

The heights of the first waveguide 12 and the second waveguide 33 may be the same. The second waveguide 33 may be formed lower than the first waveguide 12 as illustrated in FIG. 7 to obtain a configuration with the increased width of the curvature 33a. This configuration may also control the bending loss while reducing the temperature dependence of the second waveguide 33.

The output of the delay interferometer 10 B is detected by a photodetector (PD) 25. The detection result is input to the control IC 70 such that the resonance wavelength of the resonator 23 is controlled. A portion other than the shape of the curved portions of the second waveguide 33 is the same as the configuration of FIG. 4, and duplicate description is thus omitted.

Modification 2

Figure 10:
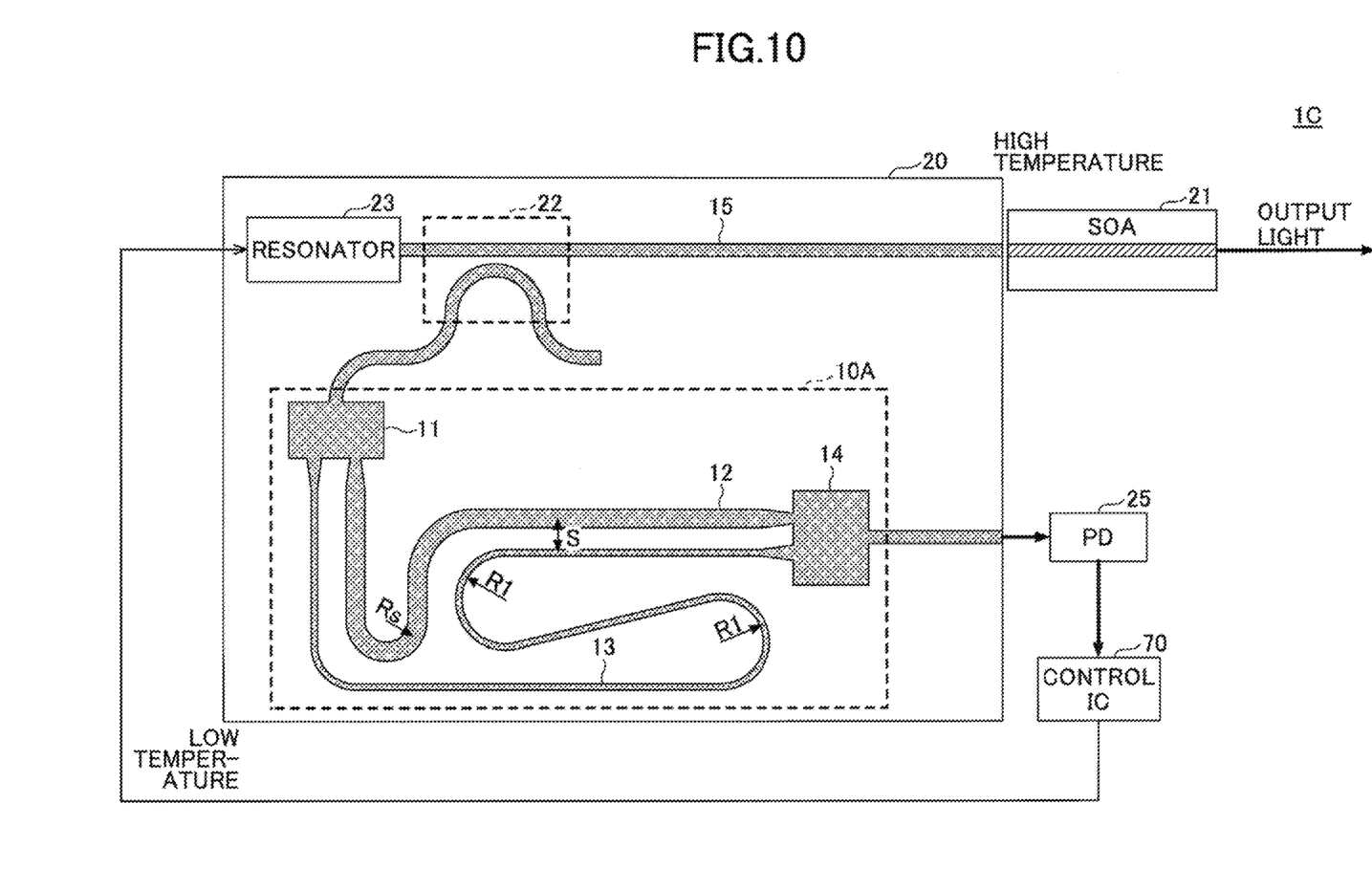
FIG. 10 is a diagram illustrating a second modification of the optical device according to the embodiment.

FIG. 10 illustrates a tunable light source 1C as still another modification example of the tunable light source 1A. The SOA 21 that is a stimulated emission medium does not necessarily have to be mounted on the substrate 20; the SOA 21 may be disposed outside the substrate 20 as illustrated in FIG. 10. In this case, the active layer of the SOA 21 and the waveguide 15 formed on the substrate 20 are butt-coupled.

The light stimulated and emitted by the SOA 21 by carrier injection repeatedly reflects between the reflecting portion of the resonator 23 and an output end of the SOA 21 and is amplified at the resonance wavelength of the resonator 23 to cause laser oscillation. A part of the laser light is guided to a wavelength filter formed with the delay interferometer 10A, and the wavelength is monitored by the wavelength filter and the photodetector (PD) 25. The output of the photodetector (PD) 25 is input to the control IC 70 such that the wavelength of the resonator 23 is subjected to feedback control.

The wavelength filter has an FSR that is determined based on an optical path length difference of the delay interferometer 10A, and a peak of transmission (longitudinal mode) appears periodically at intervals of FSR. In the delay interferometer 10A of the embodiment, the characteristics of optical confinement between the two waveguides are differentiated so as to compensate for the change in the delay amount due to the temperature change and to have the curvature radius of curvature that satisfies a predetermined condition. As a result, shifting of peak wavelength due to temperature change may be controlled while reducing the size of a light source chip. In addition, the change in the heat distribution or the temperature gradient on the substrate 20 may be reduced by disposing the SOA 21 outside the substrate 20. Accordingly, the shift of the peak wavelength of the wavelength filter may further be controlled, thereby implementing stable wavelength control.

The same effect may be obtained by using the delay interferometer 10B of FIG. 9 in place of the delay interferometer 10A forming the wavelength filter.

Modification 3

Figure 11:
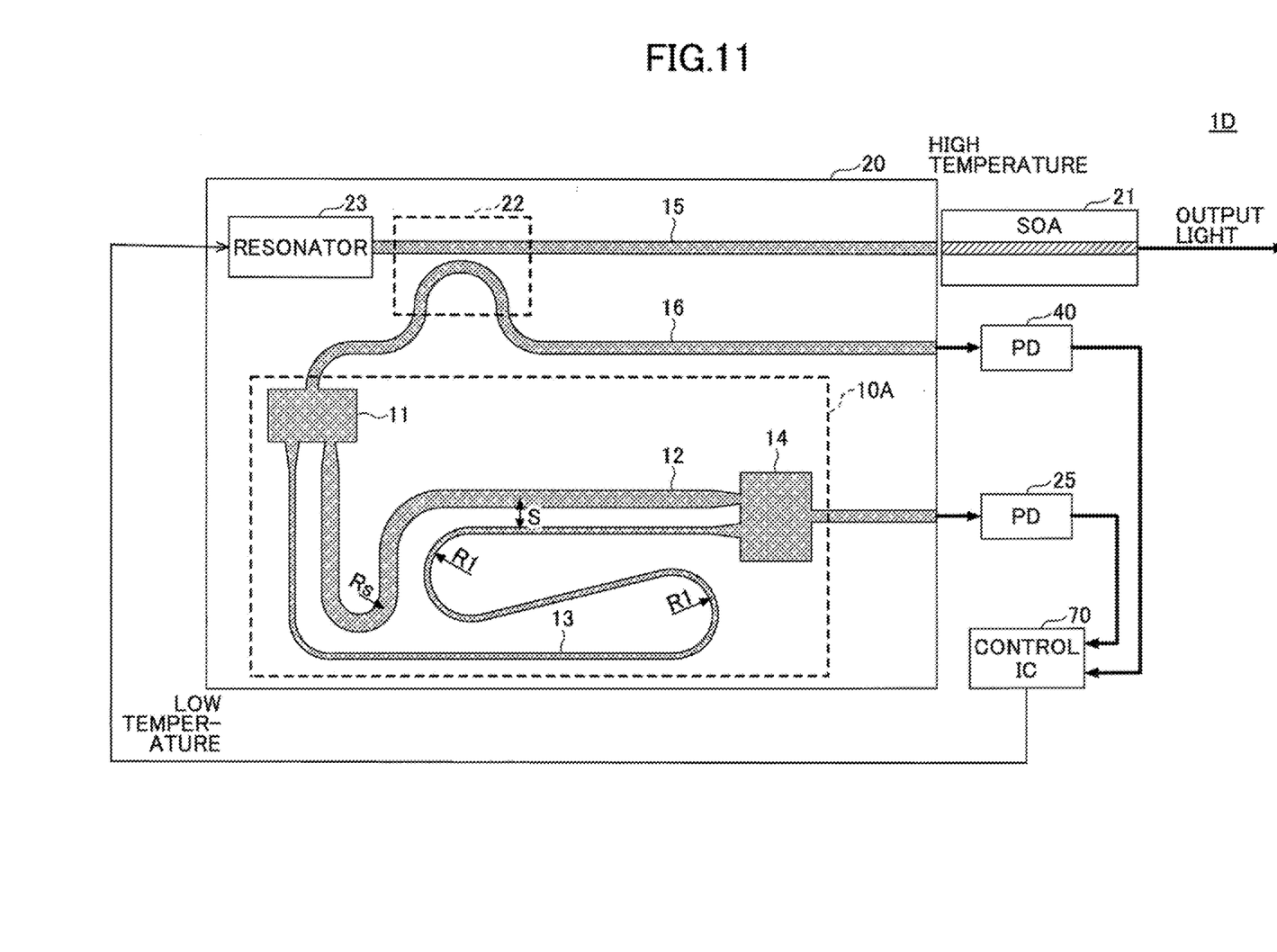
FIG. 11 is a diagram illustrating a third modification of the optical device according to the embodiment.

FIG. 11 illustrates a tunable light source 1D as still another modified example of the tunable light source 1A. The tunable light source 1D further includes a second photodetector (PD) 40 for power monitoring in addition to the configuration of FIG. 10. A waveguide 16 is formed on the substrate 20 so as to guide the output light generated by the SOA 21 and the resonator 23 to the second photodetector (PD) 40. The waveguide 16 extends from a port of the coupler 22, on the opposite side of the wavelength filter. Unlike the interferometer, the effect on the waveguide 16 is small due to the temperature change; hence, the waveguide 16 is located closer to the SOA 21 than the delay interferometer 10A. In the example of FIG. 11, the waveguide 16 is formed on the substrate 20 between the SOA 21 and the delay interferometer 10A.

Outputs of the photodetector (PD) 25 for wavelength monitoring and the photodetector (PD) 40 for power monitoring are connected to the input of the control IC 70. High precision wavelength monitoring and control may be achieved by using the optical power detected by the second photodetector (PD) 40 as a reference. For example, the resonance wavelength is controlled such that the power of the light detected by the photodetector (PD) 25 for wavelength monitoring is set to a level of a certain ratio (e.g., ½ level) of the power monitoring value detected by the second photodetector (PD) 40. As a result, the standard of wavelength control is uniquely determined to stabilize the control. The output of the second photodetector (PD) 40 may be used for light output control of the SOA 21.

The delay interferometer 10B of FIG. 9 may be used instead of the delay interferometer 10A of FIG. 11. In this case, the waveguide 16 extending from the coupler 22 toward the opposite side of the delay interferometer 10B is disposed at a position close to the SOA 21, thereby enabling the second photodetector (PD) 40 to detect the output light from the waveguide 16.

Application to Optical Transmitter

Figure 12:
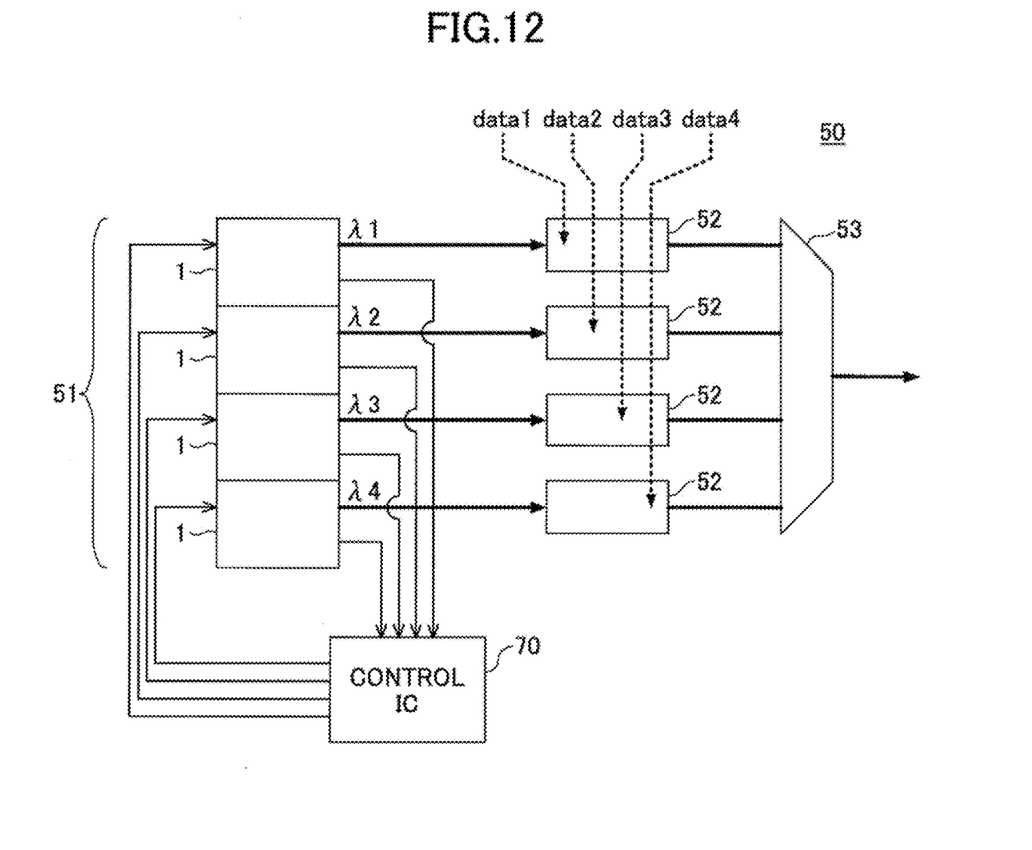
FIG. 12 is a schematic diagram of an optical transmitter using the optical device of the embodiment.

FIG. 12 is a schematic diagram of the optical transmitter 50 having the tunable light sources 1A to 1D according to the embodiment and modifications 1 to 3. Any configuration of the tunable light sources 1A to 1D may be applied to the optical transmitter 50 and is referred to as a general term "tunable light source 1".

The optical transmitter 50 includes a light source array 51 having multiple tunable light sources 1 in array. Each tunable light source 1 employs the same kind of light source, except that the resonance frequency of the resonator 23 is adjusted according to the wavelength to be used. A tunable light source array configured to output light of different wavelengths may be obtained by setting the resonance frequency of the resonator 23 to a desired value. The example of FIG. 12 illustrates a 4-channel light source array 51 configured to output light of wavelengths λ1 to λ4. Since the temperature dependence of each tunable light source 1 is controlled while reducing its size, the size of the light source array 51 may also be reduced.

Multiple tunable light sources 1 have wavelength filters of the same configuration. Any of the delay interferometers 10A and 10B may be used as the wavelength filter. A difference in length between the waveguides 12 and 13 is set such that a spatial frequency response (SFR) of the wavelength filter is adapted to the peak wavelength interval of λ1 to λ4. In addition, the temperature dependency of the peak wavelength is controlled, and light having wavelengths of λ1 to λ4 may be stably extracted and monitored in the periodic transmission spectrum, as described above. The monitor result is supplied to the control IC 70, and the resonance wavelength of the resonator is controlled for each tunable light source 1.

Light of each wavelength output from the light source array 51 is input into corresponding optical modulators 52-1 to 52-4. Drive signals representing different data 1 to 4 are input into the optical modulators 52-1 to 52-4, respectively, where lights of respective wavelengths are modulated. The modulated light of each wavelength is multiplexed by the multiplexer 53 and transmitted by one optical fiber.

As described above, according to the configuration of the embodiment, it is possible to implement a wavelength filter (optical device) that is small in size and low in temperature dependency. When the wavelength filter is used as a tunable light source used for optical communications, the size of the light source may be reduced, and in addition, the output wavelength may be stably and accurately monitored. The use of a light source array of multiple wavelengths precisely wavelength-controlled may improve the communication quality of the WDM scheme.

In this embodiment, the wavelength of the external resonator laser light source having the SOA 21 as the stimulated emission medium is controlled by the tunable light sources 1A to 1D. However, the embodiment is not restricted to this example alone. The configurations of the delay interferometers 10A and 10B of the embodiment may also be applied to a case where a semiconductor laser having a resonance function is used as a stimulated emission medium. For example, the embodiment is also applicable to a configuration using, as a light source, a tunable laser in which distributed feedback (DFB) regions and distributed Bragg reflector (DBR) regions are alternately disposed. In addition, the delay interferometers 10A and 10B may be applied to any optical device configured to extract light at periodic wavelength intervals in an environment affected by a change in temperature gradient.

The disclosed embodiment and modifications may implement an optical device that is compact and low in temperature dependency.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiments of the present invention have been described in detail, it should be understood that the various changes, substitutions, and alterations could be made hereto without departing from the spirit and scope of the invention.

What is claimed is:

1. An optical device comprising:
a first waveguide disposed between a branching portion and a multiplexing portion on a semiconductor substrate; and
a second waveguide disposed between the branching portion and the multiplexing portion, the second waveguide being longer than the first waveguide, wherein
an optical confinement effect of the first waveguide is greater than an optical confinement effect of the second waveguide,
the first waveguide has a curvature with a first curvature radius (Rs),
the second waveguide has a curvature with a second curvature radius (Rl), and
the first curvature radius is smaller than the second curvature radius.

2. The optical device as claimed in claim 1, wherein
a distance (S) between respective centers of closest portions of the first waveguide and the second waveguide indicates a distance at which optical coupling does not occur between the first waveguide and the second waveguide, and the distance (S) is smaller than twice the second curvature radius.

3. The optical device as claimed in claim 1, wherein
the second waveguide includes a serpentine waveguide having two or more turns, and the serpentine waveguide includes two or more curvatures each with a curvature radius larger than the first curvature radius.

4. The optical device as claimed in claim 1, wherein
a width (Ws) of a core of the first waveguide is set to be larger than a width (Wl) of a core of the second waveguide.

5. The optical device as claimed in claim 1, wherein
a height of a core of the first waveguide is set larger than a height of a core of the second waveguide.

6. The optical device as claimed in claim 1, wherein
the first waveguide is a rib waveguide, and the second waveguide is a thin wire waveguide.

7. The optical device as claimed in claim 6, wherein
a width of a rib portion of the first waveguide is larger than a width of the second waveguide.

8. The optical device as claimed in claim 1, wherein
each of the first waveguide and the second waveguide is a silicon waveguide.

9. A tunable light source comprising:
a stimulated emission medium; and a delay interferometer configured to receive a part of light generated by the stimulated emission medium and amplified at a predetermined resonance wavelength, wherein the delay interferometer has a first waveguide and a second waveguide formed on a semiconductor substrate, a length of the first waveguide is shorter than a length of the second waveguide, an optical confinement effect of the first waveguide is greater than an optical confinement effect of the second waveguide, the first waveguide has a curvature with a first curvature radius (Rs), the second waveguide has a curvature with a second curvature radius (Rl), and the first curvature radius is smaller than the second curvature radius.

10. The tunable light source as claimed in claim 9, wherein the stimulated emission medium and the delay interferometer are disposed at diagonal positions on a main surface of the semiconductor substrate.

11. The tunable light source as claimed in claim 9, further comprising:

a power monitoring waveguide disposed between the stimulated emission medium and the delay interferometer on the semiconductor substrate.

12. The tunable light source as claimed in claim 9, wherein the second waveguide includes a serpentine waveguide having two or more turns, and the serpentine waveguide includes two or more curvatures each with a curvature radius larger than the first curvature radius.

13. An optical transmitter comprising:

the tunable light source as claimed in claim 9, and an optical modulator configured to receive light output from the tunable light source.

14. The optical transmitter as claimed in claim 13, comprising:

a light source array including a plurality of the tunable light sources disposed in array; and a plurality of optical modulators configured to receive light beams of different wavelengths output from the light source array.

* * * * *